March 22, 1955
L. J. GERBAUD
2,704,418
MACHINE FOR THE MANUFACTURE OF HOLLOW GLASS ARTICLES
Filed Feb. 27, 1951
5 Sheets-Sheet 1
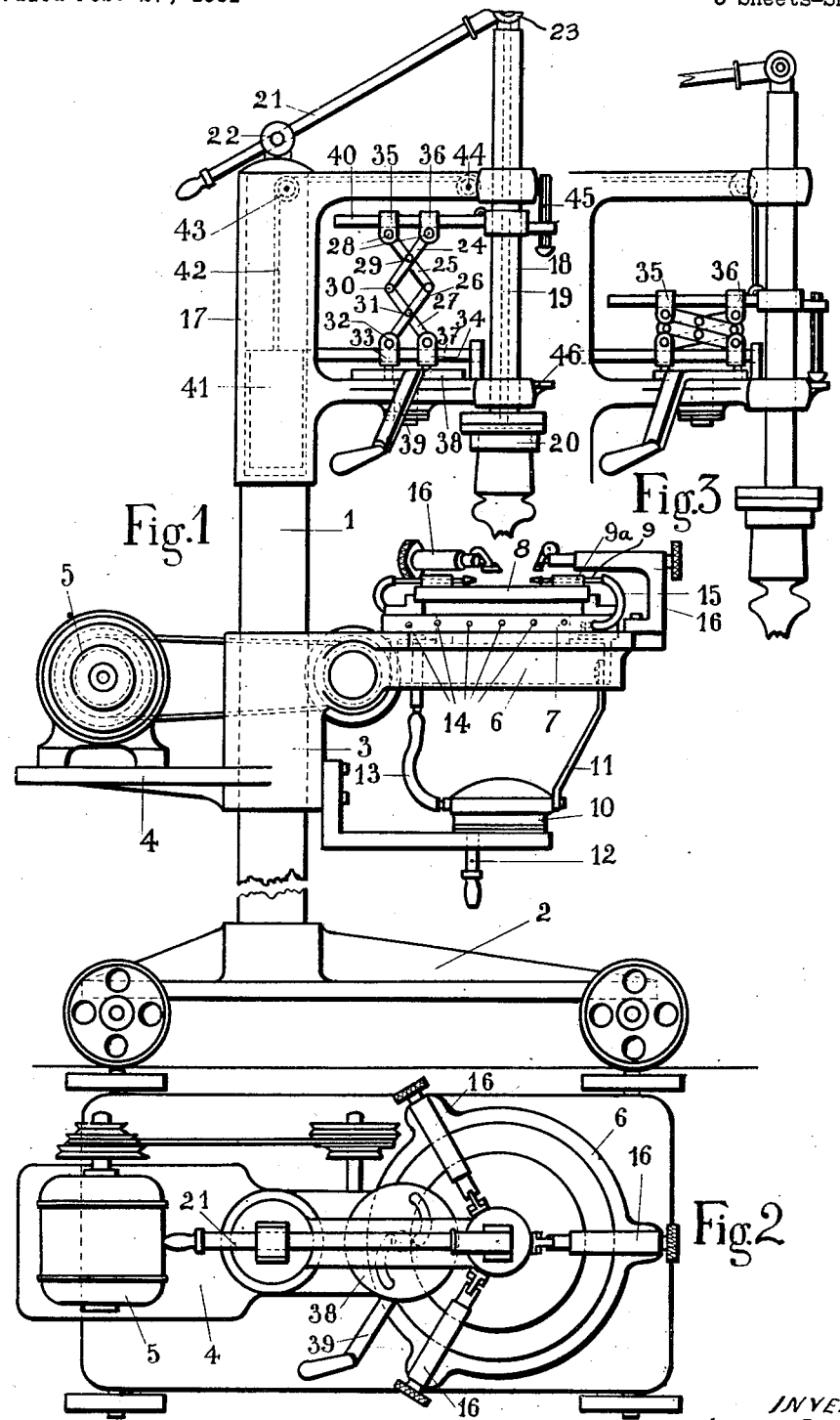
INVENTOR:
LUCIEN JULIEN GERBAUD
By Richardson, David and Tudor
Att'ys

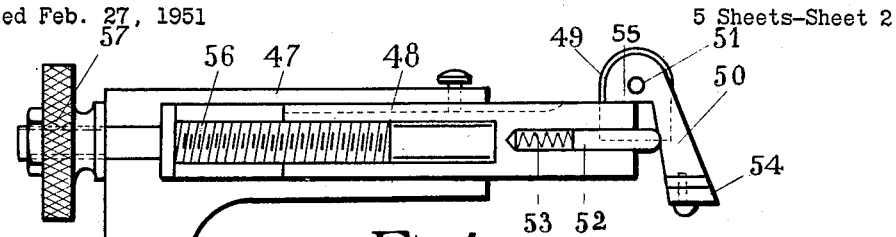
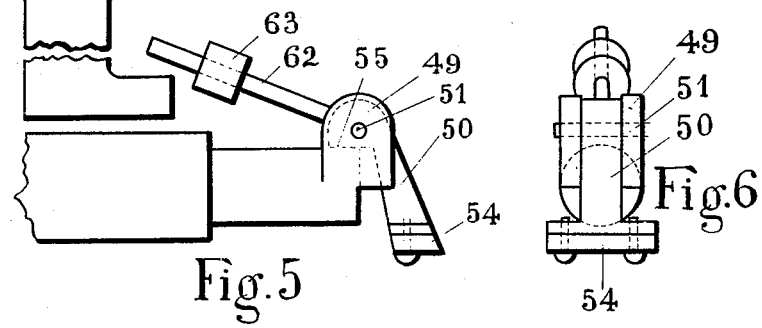
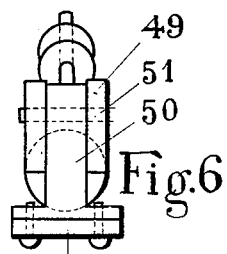
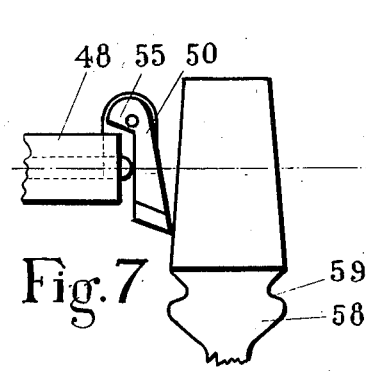
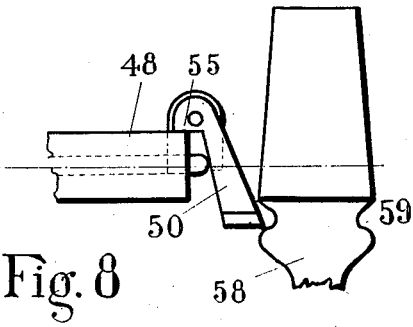
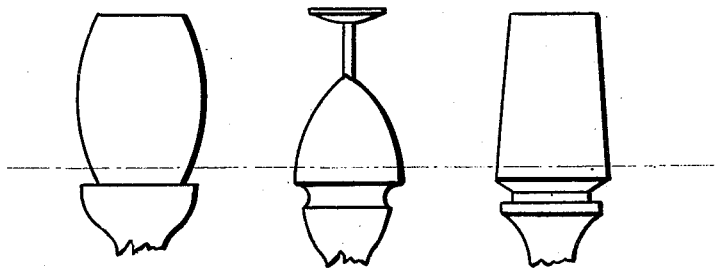

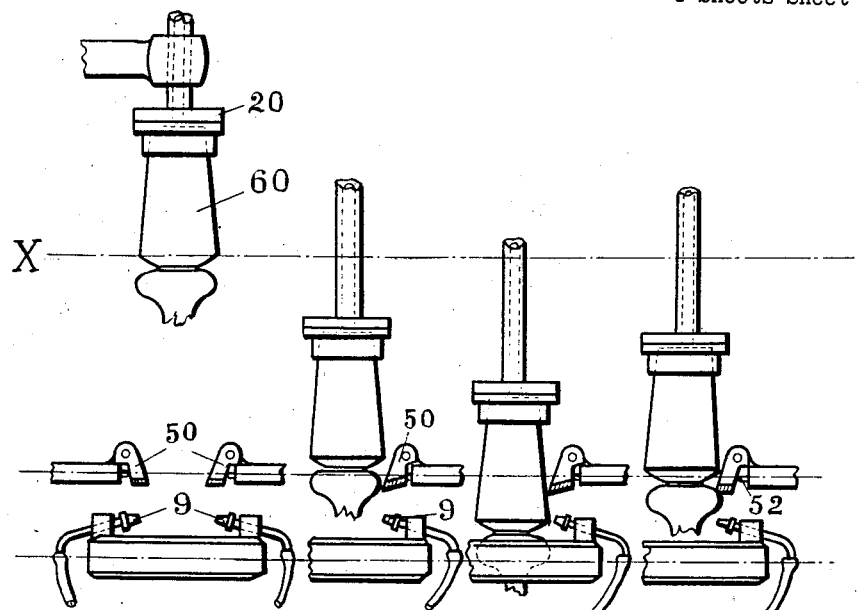
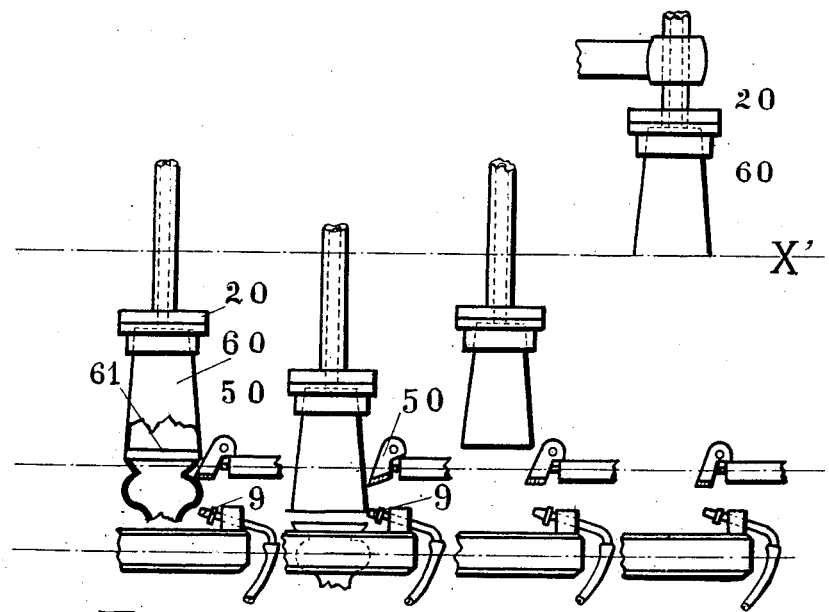

March 22, 1955 L. J. GERBAUD 2,704,418
MACHINE FOR THE MANUFACTURE OF HOLLOW GLASS ARTICLES
Filed Feb. 27, 1951 5 Sheets-Sheet 4

INVENTOR:
LUCIEN JULIEN GERBAUD
By
Richardson, David and Nordon
Attys

March 22, 1955     L. J. GERBAUD     2,704,418
MACHINE FOR THE MANUFACTURE OF HOLLOW GLASS ARTICLES
Filed Feb. 27, 1951     5 Sheets-Sheet 5
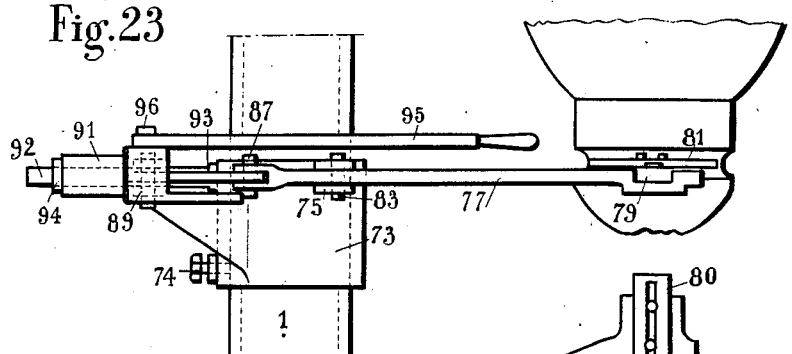
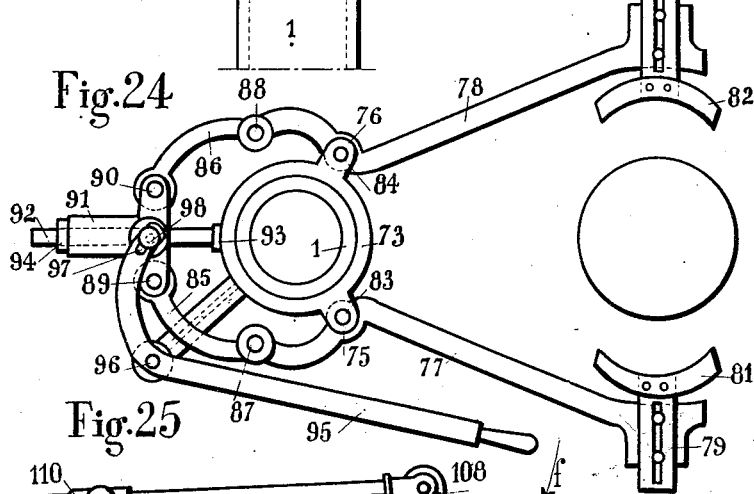
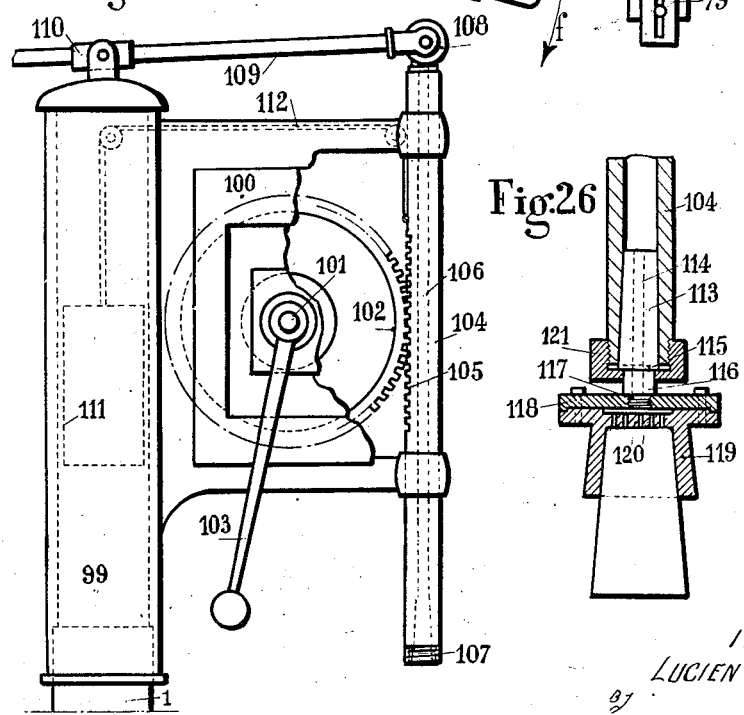
INVENTOR:
LUCIEN JULIEN GERBAUD
By
Richardson, David and Nordon
Att'ys

United States Patent Office 2,704,418
Patented Mar. 22, 1955

2,704,418

MACHINE FOR THE MANUFACTURE OF HOLLOW GLASS ARTICLES

Lucien Julien Gerbaud, Paris, France, assignor to Automatic Glassware Machinery Company Ltd., dite: S. I. E. M. A. V., Tanger Application February 27, 1951, Serial No. 212,860

Claims priority, application France March 3, 1950

6 Claims. (Cl. 49—50)

Our invention has for its object improvements in the manufacture of hollow glass articles such as drinking glasses, glass vases, glass fixtures for illuminating purposes, containers for chemical laboratories and the like.

In the manufacture of hollow glass articles having a comparatively wide opening, it is necessary to mould said articles by forming an extension thereon, the diameter of which tapers towards its end in order that the blowing of the article may be executed more conveniently; this extension should then be cut off so as to give the article its final length and to shape at the same time the opening therein.

It is possible to separate at raised temperature or at room temperature the extension from the finished article; most of the methods used for such a separation at a raised temperature show the drawback of leaving a thick bead along the edge of the article after sectioning same. If the sectioning is performed at room temperature, it is necessary to resort to an expensive sequence of operations and transfers and the frequency of breakage leads to a prohibitive cost price.

Now, our invention has for its object firstly, a method for preventing the formation of a bead when cutting the extension at raised temperature and, furthermore, the machines for executing said method.

This method for separating from a hollow glass article an extension thereof that has been formed with a view to an easier blowing of the glass article, is characterized by the fact that a plurality of flame jets arranged annularly round the article provided with its extension is constrained to revolve with reference to the latter after which the annular area of the article thus heated is drawn out when no longer submitted to the action of the flames, said drawing operation being stopped before the actual breaking of the glass, and finally the annular drawn and thinned-out area of the article is submitted again to said flame, in order to provide for an accurate and instantaneous sectioning of the glass along said area.

There is preferably provided on the extension of the article a peripheral laterally projecting shoulder portion which may be engaged to facilitate the heating and drawing operations, the remainder of the surface of the extension being smooth so as to allow a sliding movement thereon of the means that are to take hold of the article.

The required relative rotary movement between the flame jets and the object may be obtained either by rotation of the flame jets with the article stationary, or by rotation of the article with the flame jets stationary.

The machines for the execution of said method are characterized by the fact that they include in combination an article-carrier, means for taking hold of the extension of the article, which means lie axially of said article carrier, a set of burners distributed annularly round the common axis of said article carrier and last mentioned means, further means for executing a relative shifting in a direction parallel to said axis of the article-carrier with reference to the first-mentioned means and to the set of burners and, finally, means for constraining the burners to rotate with reference to the article carrier round the above mentioned axis.

The article carrier is preferably constituted by a chuck provided with suction holding means.

The means for taking hold of the peripheral shoulder portion of the article may be constituted by a plurality of carriers arranged radially and including holding members adapted to engage the shoulder portion of the article automatically when the latter is caused to move in the direction accompanying the drawing operation.

According to a modification suiting more particularly articles of a large diameter, said means for taking hold of the article is constituted by a system of jaws controlled by a manually operated lever.

In a preferred embodiment of our invention, the nozzles of the burners producing the flame jets slope with reference to the plane of the circle along which they are distributed and they are arranged in planes parallel to the axis of the burner system passing through the center of said circle, these planes being located at a predetermined distance from said axis.

The burners may be constituted by bent pipes that are arranged radially and the nozzles of which are laid at an angle therewith corresponding to the slope referred to hereinabove, i. e. they form a predetermined angle with the transverse plane common to the actual pipes and with the radial planes containing the corresponding pipes.

The arrangement for displacing the article carrier axially with reference to the remainder of the machine may comprise a lazy tongs movement controlled by a cam-carrying lever and adapted to provide for the axial sliding of a rod to which the article carrier is secured.

According to a modification, said arrangement includes a pinion or toothed sector meshing with a rack having teeth formed in the sliding rod to which the article carrier is secured.

Adjustable stops allow limiting the relative shifting of the article carrier to the exact length corresponding to that required for a particular run of articles that are to be cut.

We have described hereinafter by way of an example that should be considered as purely descriptive and by no means as limiting the scope of the invention, an embodiment of such a machine together with a number of preferred modifications. The method will be readily understood from the description of the operation of the machine. In accompanying drawings:

Fig. 1 is an elevational view of the machine;
Fig. 2 is a plan view from above;
Fig. 3 illustrates the means for vertically displacing the articles, showing an article in its lowered position;
Fig. 4 illustrates part of the arrangement adapted to engage the projecting shoulder portion of a glass article;
Figs. 5 and 6 are a side view and a front view respectively of a modification of last mentioned arrangement;
Figs. 7 and 8 illustrate the operation of the automatic article-engaging arrangement.
Figs. 9 to 11 illustrate by way of example various shapes that may be given to the projecting shoulder portion of the article;
Figs. 12 to 19 illustrate the successive steps of the operation to be executed;
Figs. 20 and 21 illustrate diagrammatically in elevational and in plan view the arrangement of the burners according to a preferred embodiment of the invention;
Fig. 22 is a sectional view of an angularly directed burner that may be used for producing a flame similar to the flames produced in the case of Figs. 20 and 21;
Figs. 23 and 24 illustrate diagrammatically in elevational and in plan view the arrangement adapted to engage and hold fast articles having a large diameter;
Fig. 25 is an elevational view of a modified arrangement controlling the axial shifting of the article carrier;
Fig. 26 is a corresponding longitudinal cross-sectional view of the article-carrying chuck mounted on its sliding rod;

The machine illustrated in Fig. 1 includes a central upright 1 mounted on the carriage 2; said upright carries a body 3 adapted to slide vertically thereon; said body is provided with a bed 4 carrying an electric motor 5 and is further provided with an annular carrier 6 inside which is revolubly fitted a rotary annulus 7 carrying a further annulus 8 provided with radially bored bosses 8a carrying in their turn a number of burners or blow pipes 9 each of which is slidably mounted along its axis.

These cams control the movements of the burners 9 towards and away from the center of the annulus in order to obtain instantaneously the diameter for the annular flame system that corresponds to that of the glass article, and said burner arrangement that is angularly fixed with respect to the annulus 7 is rotated by means of a suitable gear driven by a belt or the like means connecting it operatively with the electric motor 5.

A gasiform mixture is fed to the burners through a rotary valve 10 which revolves with the annulus 7 through the agency of a rigid arm 11; the gasiform mixture is admitted to the valve through the pipe 12 and flows through an annular channel formed between the cooperating surfaces of the valve 10; said valve is connected in its turn through a pipe 13 with an annular channel provided inside the annulus 7, which channel serves as a distributor feeding a plurality of conduits 14 leading each to the corresponding burner through a pipe 15.

To the annular non-rotary carrier 6 are secured carrier members 16 adapted to hold the projecting shoulder portion of the glass article during the drawing operation.

The upper part of the upright 1 carries an auxiliary support 17 that serves as a carrier for a vertical rod 18 adapted to slide axially therein; said rod is provided with an axial bore 19 and carries at its lower end a chuck 20 the shape of which is selected for suitably receiving the article to be cut the article being held in place in said chuck through suction.

The suction produced through means (not shown), that may be independent of the machine or otherwise, is applied through a sloping channel 21 pivotally connected at its ends 22 and 23 whereby it is capable of following through the latter end the vertical movement of the rod 18.

If the glass article does not have a shape suitable for it to be held through suction, there is substituted for the chuck 20 an expansible mechanical chuck of any desired conventional type generally used for such purposes.

The rod 18 should assume a very rapid vertical movement. In order to obtain the high speed required we resort to an expansible lazy tongs raising device including the members 24, 25, 26, 27 that are assembled through pivotal axes such as 28, 29, 30, 31, 32; said members form with one another a system of pivotal link motions or a toggle joint. The ends of this lazy tongs movement are connected with the sliders 33, 34, 35, 36; of these, the lower sliders 33 and 34 are carried by a stationary slideway or rod 37; they are controlled by a spirally grooved cam 38 through the agency of a handle 39 that constrains them to be shifted horizontally toward or away from each other over said slideway. The upper sliders 35 and 36 move of necessity in synchronism with the sliders 33 and 34 but, as they are carried by a slideway or rod 40 that is rigidly secured to the vertical rod 18, there is provided through the spacing of the sliders 33 and 34 a gradual collapse of the lazy tongs movement which leads to an immediate downward movement of the rod 18, while the reverse movement of the sliders allows obtaining an upward movement of the said rod 18 at an equally high speed.

The mechanism thus described is exactly balanced by a counterweight 41 connected with the vertically shiftable rod 18 through a cable or a chain 42 engaging the rollers 43 and 44 and it is therefore possible to stop at any predetermined point the upward or downward movement of the rod 18, this being essential with a view to submitting the glass article to the operations required for its sectioning. An adjustable stop 45 on the rod 40 adapted to meet the stationary projection 46 allows adjusting accurately the height at which the glass article is to be cut.

Fig. 2 is a plan view from above showing more particularly the three abovementioned carriers 16 adapted to hold the shoulder portion of the glass article, said carriers being secured to the annular stationary support 6; said Fig. 2 also shows the spirally grooved disc cam 38 that serves for controlling the lower sliders 33 and 34 and the handle 39 controlling said cam 38.

Fig. 3 shows the rod 18 that has displaced to its lowered position by reason of the spacing imparted to the lower sliders 33 and 34, said spacing leading to a collapse of the lazy tongs motion.

Fig. 4 illustrates the automatic means for engaging the shoulder portion of the glass article; said arrangement is constituted by a number of the above mentioned carriers 16 fixed to the annular support 6 and that are consequently not adapted to revolve. Each of said carriers 16 includes a horizontal cylinder 47 inside which is slidably fitted a piston 48 the front end of which carries a pair of ears 49 between which is fitted a suitably shaped angularly movable finger member 50. Said finger member is pivoted on a pin 51 whereby it is yieldingly movable against the action of a sliding rod member 52 urged forwardly by a spring 53; the lower surface of said finger member 50 is provided with an end portion of thermally insulating or refractory material 54; a flat surfaced portion 55 at the opposite end of the finger member 50 forms an abutment engaging the upper surface of the piston 48. The piston 48 is adapted to be adjusted horizontally inside the cylinder 47 under the action of the thrust exerted by the screw 56 controlled by the knob 57; this shifting of the piston provides for an adjustment of the diameter of the passage left free for the glass article and for its extension to the front of the finger member 50.

According to a modification of this arrangement as illustrated in Fig. 5, the finger member 50 is provided with a sloping rod 62 on which a counterweight 63 is adjustably mounted that allows suitably counterbalancing the finger member 50 that is thus returned automatically at 55 against the stop formed by the upper piston surface.

Fig. 6 is a front view of the last described arrangement, said Fig. 6 showing how the finger member 50 is fitted between the pair of ears 49 forming a hinge therefor and inside which said finger member is pivoted on the pin 51.

Fig. 7 shows the finger member 50 as angularly displaced by the thrust of the glass article which constrains it to rock when said glass article is urged downwardly into register with the burner; the shouldered extension 58 and the groove or neck portion 59 therein pass readily in front of the projection 50 and the abutment 55 is raised by reason of the rocking movement of the latter.

Fig. 8 shows that when the glass article is raised again, the finger member 50 engages automatically the shouldered portion immediately below the neck or groove 59 in the extension of said article while the abutment 55 comes again into normal contacting relationship with the piston 48 and allows the projection 50 to hold rigidly the shouldered portion of the extension 58 on the glass article without said extension being capable of release when the rising movement of the glass article continues with a view to performing a drawing operation on the annular heated area.

Figs. 9, 10 and 11 illustrate by way of example various forms that may be given to said extension of the glass article; the rough peripheral projecting shoulder portion on said extension may assume any desired shape, provided it allows the finger member 50 to engage it.

Fig. 12 illustrates the actual glass article 60 that is positioned inside the chuck 20 in which it is held by suction.

Fig. 13 shows the article as it is lowered into register with the rotary burners 9, the finger members 50 being then constrained to rock as disclosed under the action of the pressure exerted by the glass article in order to allow the extension on said article to pass them.

Fig. 14 shows the same article during the heating of the annular zone that is to be submitted to the drawing operation.

Figure 20:
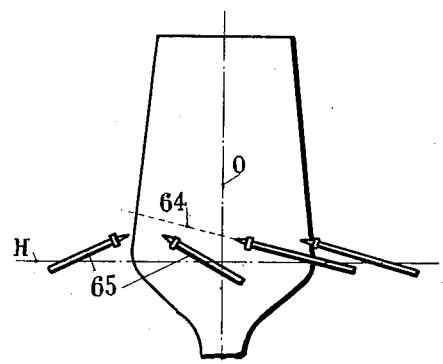
Figure 22:
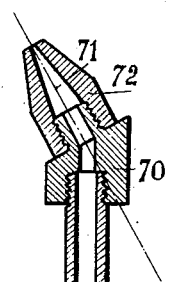

Lastly, Fig. 15 shows the same article during its subsequent rising movement at the moment at which the spring pressed finger members 50 submitted to the thrust exerted by the sliding rod members 52 engage the rough peripheral projection defined by the groove 59.

Fig. 16 illustrates the actual drawing operation during which the extension is held rigidly by the finger members 50 while the chuck 20 carrying the glass article 60 continues its upward movement and produces consequently a drawing of the annular zone 61 that has been previously heated; this drawing operation is thus effectuated outside of the direct heating zone of the flames of the burners 9.

Fig. 17 shows the article after it has returned into register with the burners 9; the finger members 50 have consequently been shifted outwardly and away from one another and the cutting off of the extension of the glass article is provided substantially instantaneously along the line separating the part that has been reduced in thickness, from the portion of the article that has retained its original thickness.

Fig. 18 shows the finished article after it has been separated from its extension.

Lastly, Fig. 19 shows the chuck 20 returned into its original position with the finished article 60.

Figure 21:
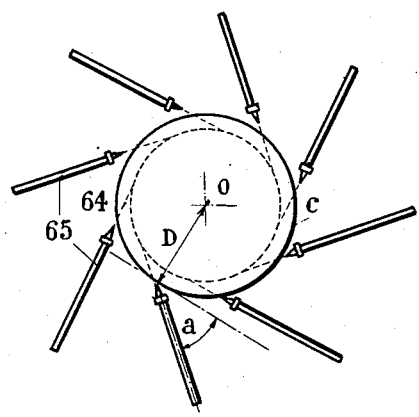

According to a preferred embodiment, the geometrical axes 64 of the burner nozzles 65 (Figs. 20 and 21) assume a slope by a certain angle with reference to the horizontal plane carrying the actual nozzles of the burners 65 (Figs. 20 and 21) and they lie in vertical planes located at a same distance D from the axis 0 of the burner arrangement. Consequently, the burner nozzles form an angle $a$ that is comparatively small with the periphery C of the article to be cut.

It is possible, within the scope of said modification, to use angularly directed burners including tubular parts extending radially with reference to the axis 0 of the burner arrangement or else burners that are provided with obtuse elbows 70 carried at the end of tubular members 69 and which provide the required angular direction in a manner such that the axis 71 of their angularly directed portions may assume the desired angle with reference to the horizontal and with reference to the periphery C of the glass article; nozzles 72 are fitted at the end of these elbows. This latter embodiment allows a simple and convenient modification of machines that have been originally designed for a radial arrangement of the burners.

At any rate, the nozzles of the burners being thus sloping both with reference to a horizontal plane and with reference to a radial plane, the flames lick nearly tangentially or at a small angle $a$ the peripheral circular line C along which the article is to be cut without said flames urging the softened glass inwardly of the article at the moment of the cutting off of the extension; furthermore, said flames do not converge towards the centre of the article and do not meet one another at said central point once the sectioning has been performed; as a matter of fact, they lick at the same time the inner wall and the outer wall of the article while forming eddies inside said article which produces a perfect final trimming and this cuts out consequently the straining of the glass that otherwise could not be avoided. The number of burners depends on the thickness of the glass and on the diameter of the article to be produced.

In a modification, it is possible, when cutting certain types of glass articles, to make the said articles assume a rotary movement in any desired and well known manner, while the burners are held stationary; when the article is to be subjected to the drawing operation, its rotation should first be stopped, said rotation being then resumed with a view to cutting off the drawn part.

According to a further arrangement that is more particularly adapted for the cutting off of extensions on glass articles of a large diameter and as illustrated in Figs. 23 and 24, the means for engaging the glass article and holding it fast includes a supporting sleeve 73 vertically adjustably mounted on the upright 1 and held at the desired height by a screw 74. At the upper end of the sleeve, two bosses 75 and 76 carry the pivoting arms 77 and 78 provided at their free ends with the jaw carriers 79 and 80 and the jaw members 81 and 82. The arms 77 and 78 are pivoted on the pins 83 and 84, and are also pivotally connected at their ends opposite their free ends by pivot pins 87 and 88 with the links 85 and 86. The links 85 and 86 are pivotally connected with the laterally extending arms of a T-shaped member 91 slidably mounted on a guide rod 92 fixed to the supporting sleeve 73. The travel of the sliding member 91 is limited by the stops 93 and 94. Said sliding member 91 is controlled in its turn by a lever 95 pivotally secured to the stud 96 rigid with the sleeve 73, the end of said lever being provided with an elongated slot 97 engaging a stud 98 carried by the sliding T-shaped member 91.

When the lever 95 is actuated in the direction of the arrow $f$, the sliding member 91 is moved towards the stop 93 on the sleeve 73 whereby it provides for a shifting of the pivots 87 and 88 outwardly so as to constrain the arms 77 and 78 to close the jaws 81 and 82 over the neck portion of the glass article to be cut. This arrangement allows obtaining a considerable angular movement for the arms 77 and 78 through a comparatively small shifting of the lever 95.

According to a modification of the arrangement for producing vertical displacement of the article as required for the different operations (Figs. 25 and 26), the support carried by the upper end of the upright 1 includes an upright 99 and a case 100 rigid therewith. The case 100 carries a horizontal spindle 101 to which is secured a pinion or toothed sector 102 the radius of which is sufficiently large for it to be possible, through action on a lever 103 rigid with said pinion or sector 102, to provide for the vertical sliding movement of a rod 104 carrying a rack 105 meshing with said pinion or sector 102. Said sliding rod 104 is provided with an axial channel 106 serving as a suction pipe for holding the article to be cut. The lower end 107 of the rod is externally threaded with a view to securing thereto the article-carrying chuck 20. Said rod 104 is provided with an axial recess inside which may be fitted said article-carrying chuck. To the upper end of said rod 104 is secured a rotary pipe joint 108 that is connected with suction means, not illustrated in the drawing, through a pipe 109 carried on a rocking support 110 round which said pipe pivots in accordance with the vertical shifting imparted thereto through the vertically sliding rod 104; the system of movable parts is balanced by a counter-weight 111 that is connected with the rod 104 through a cable or chain 112 or through any other equivalent means.

With a view to securing the article-carrying chuck 20 to the sliding rod 104, said chuck (Fig. 26) includes a tapered tail piece 113 provided with a longitudinal bore 114 and ending with a shoulder 115, a cylindrical extension 116 and a threaded end 117 for the latter, said threaded portion being screwed into a plate 118 carrying the actual chuck 119 the shape of which matches that of the glass article to be cut, which latter is held in place through suction as provided through the pipes or ducts 109, 106 and 114 and through the openings 120 formed in the top seating portion of the actual chuck. A nut 121 secures the whole arrangement onto the threaded portion 107 of the rod 104. When it is desired to change the chuck, it is sufficient to unscrew the nut 121 the lower surface of which exerts, when this unscrewing continues, a thrust on the upper surface of the plate 118 so as to release the tail piece 113 carrying the chuck system.

What I claim is:

1. A machine of the class described for the severing of an extension portion from an elongated glass article of a circular cross-section, said extension portion being shaped to provide a neck portion and a shouldered portion adjacent to said neck portion, said machine comprising: chuck means for holding a portion of said article with said extension portion directed away from said chuck means; circularly arranged burner means concentric with the longitudinal axis of said article when held in said chuck means; a fixed guide rod member carried by said machine; a lazy tongs movement having one pair of end portions slidable on said fixed guide rod member; a laterally movable guide rod member spaced from and parallel to said fixed guide rod member, the other end of said lazy tongs movement being slidable on said movable guide rod member; cam means disposed to vary the spacing between said end portions of said lazytongs movement on said fixed guide rod member for varying the spacing between said two guide rod members; means connecting said movable guide rod member to said chuck means for displacing said chuck means along said longitudinal axis for bringing a peripheral portion of said article into heating relationship with respect to said burner means and for withdrawing said peripheral portion of said article being located intermediate said portion thereof held by said chuck means and said extension portion; and holding means comprising a plurality of members arranged symmetrically and radially with respect to said longitudinal axis at equal distances therefrom, said members being yieldingly movable to permit passage of said article and said extension thereby in one direction for bringing said peripheral portion into said heating relationship, and being urged inwardly toward said longitudinal axis by pressure exerting means to engage said shouldered portion of said extension upon withdrawal of said peripheral portion from said heating relationship, whereby a drawing operation may be performed on said peripheral portion while positioned away from said position of heating relationship with respect to said burner means, said drawing operation being effected by the action of said cam means after said peripheral portion has first been heated by said burner means, said extension being held during said drawing operation by engagement between said shouldered portion thereof and said holding means.

2. A machine of the class described for the severing of an extension portion from an elongated glass article of circular cross-section, said extension portion being shaped to provide a neck portion and a shouldered portion adjacent to said neck portion, said machine comprising: chuck means for holding a portion of said article with said extension portion directed away from said chuck means; circularly arranged burner means concentric with the longitudinal axis of said article when held in said chuck means; means for displacing said chuck means along said longitudinal axis for bringing a peripheral portion of said article into heating relationship with respect to said burner means and for withdrawing said peripheral portion from said heating relationship, said peripheral portion of said article being located intermediate said portion thereof held by said chuck means and said extension portion; a plurality of carriers fixed to said machine; a plurality of finger members each pivoted to one of said carriers, said finger members being arranged symmetrically and radially movably with respect to said longitudinal axis at equal disances therefrom, said finger members being movable to permit passage of said article and said extension thereby in one direction for bringing said peripheral portion into said heating relationship; pressure exerting means yieldingly urging said finger members inwardly toward said longitudinal axis for holding engagement with said shouldered portion of said extension upon withdrawal of said peripheral portion from said heating relationship, whereby a drawing operation may be performed on said peripheral portion while positioned away from said position of heating relationship with respect to said burner means, said drawing operation being effected by the action of said chuck displacing means after said peripheral portion has first been heated by said burner means, said extension being held during said drawing operation by engagement between said shouldered portion thereof and said finger members.

3. A machine according to claim 2 in which each of said finger members is provided with an end portion of thermally insulating material for engagement with said shouldered portion of said projection.

4. A machine according to claim 2, in which said pressure exerting means comprises spring means acting on each of said finger members.

5. A machine according to claim 2, in which said pressure exerting means comprises an adjustable counterweight movable with each of said finger members.

6. A machine according to claim 2, in which each of said carriers further comprises adjusting means for varying the position of each of said finger members, whereby said holding means may be adjusted for the accommodation of glass articles of various sizes.

References Cited in the file of this patent

UNITED STATES PATENTS

| | | |
|---|---|---|
| 2,334,111 | McNamara et al. | Nov. 9, 1943 |
| 2,361,824 | Dorman | Oct. 31, 1944 |
| 2,513,542 | Wohinc | July 4, 1950 |
| 2,554,339 | Lilja et al. | May 2, 1951 |

FOREIGN PATENTS

| | | |
|---|---|---|
| 829,261 | France | June 17, 1938 |